United States Patent [19]

Drlik

[11] Patent Number: 4,674,147

[45] Date of Patent: Jun. 23, 1987

[54] BOW AND SPRING HINGE ASSEMBLY FOR EYEGLASSES

[75] Inventor: Günther Drlik, Pforzheim, Fed. Rep. of Germany

[73] Assignee: Obe-Werk Ohnmacht & Baumgartner GmbH & Co. K.G., Ispringen, Fed. Rep. of Germany

[21] Appl. No.: 821,794

[22] Filed: Jan. 23, 1986

[30] Foreign Application Priority Data

Jan. 26, 1985 [DE] Fed. Rep. of Germany ....... 3502604

[51] Int. Cl.$^4$ .............................................. G02C 5/22
[52] U.S. Cl. .................................... 16/228; 351/113; 351/153
[58] Field of Search .................. 16/228; 351/113, 121, 351/153

[56] References Cited

U.S. PATENT DOCUMENTS 4,461,548  7/1984  Drlik ..................................... 16/228

FOREIGN PATENT DOCUMENTS 2115596  10/1972  Fed. Rep. of Germany ...... 351/113

Primary Examiner—Fred A. Silverberg
Attorney, Agent, or Firm—Balogh, Osann, Kramer, Dvorak, Genova & Traub

[57] ABSTRACT

This invention relates to a bow and spring hinge assembly for eyeglasses, in which each bow can be opened beyond a stop-defined position so that the bow can resiliently bear on the head of the wearer. The novel assembly can be used also with slender and thin bows and provides for a transverse bracing for eliminating a transverse backlash between relatively slidable parts. For this reason the assembly is provided in the slider and in the bow end portion with recesses, which face each other and each of which is provided on opposite sides with inwardly facing track grooves, and I-section members are provided, each of which is in sliding contact with the track grooves of both said recesses so that said I-section members hold said bow end portion and said slider together against a transverse separation.

18 Claims, 8 Drawing Figures

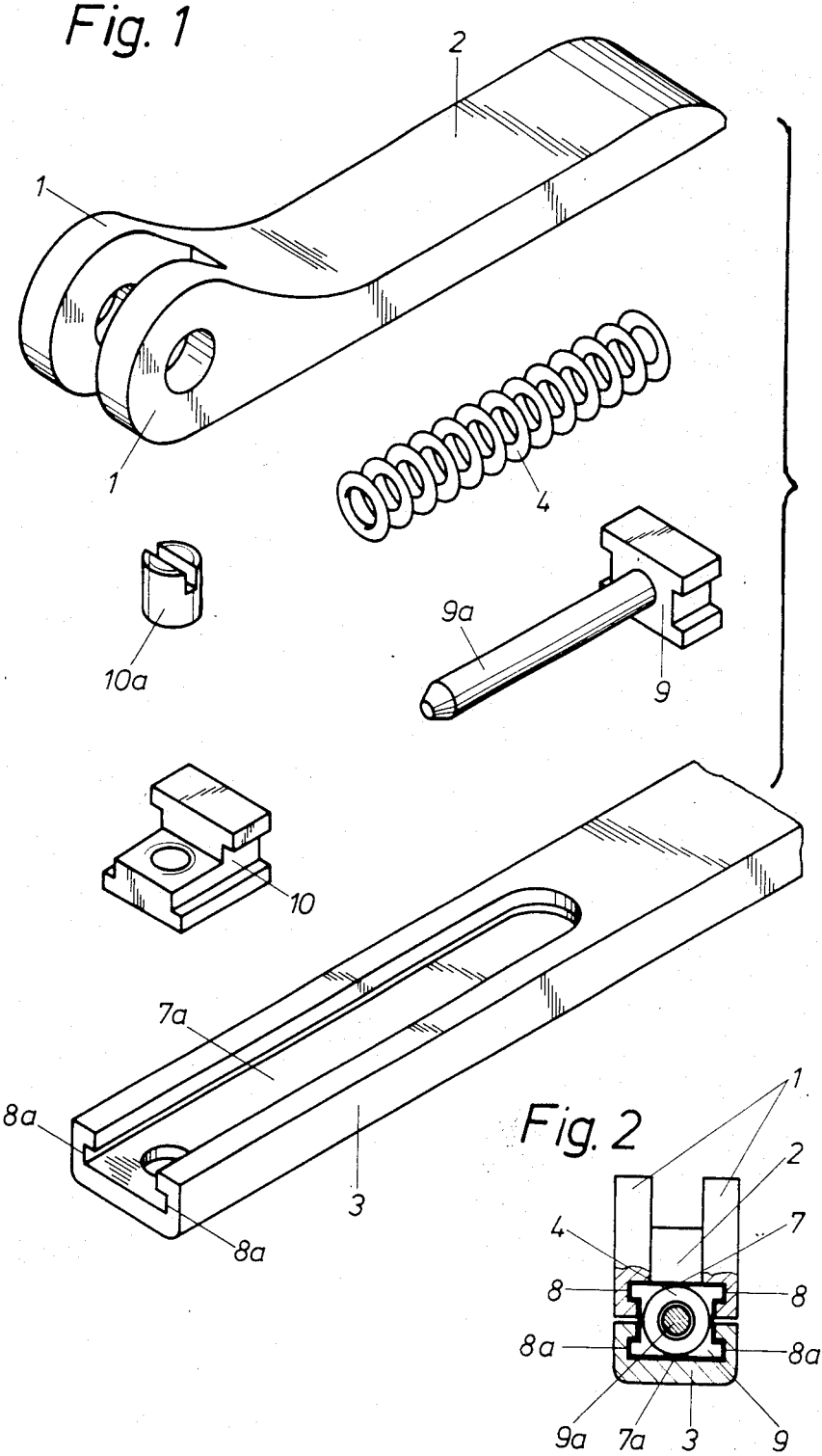

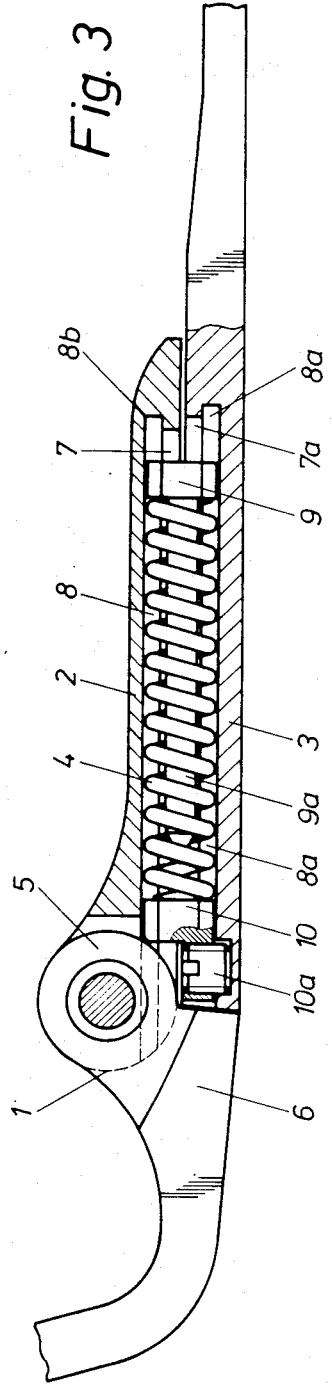
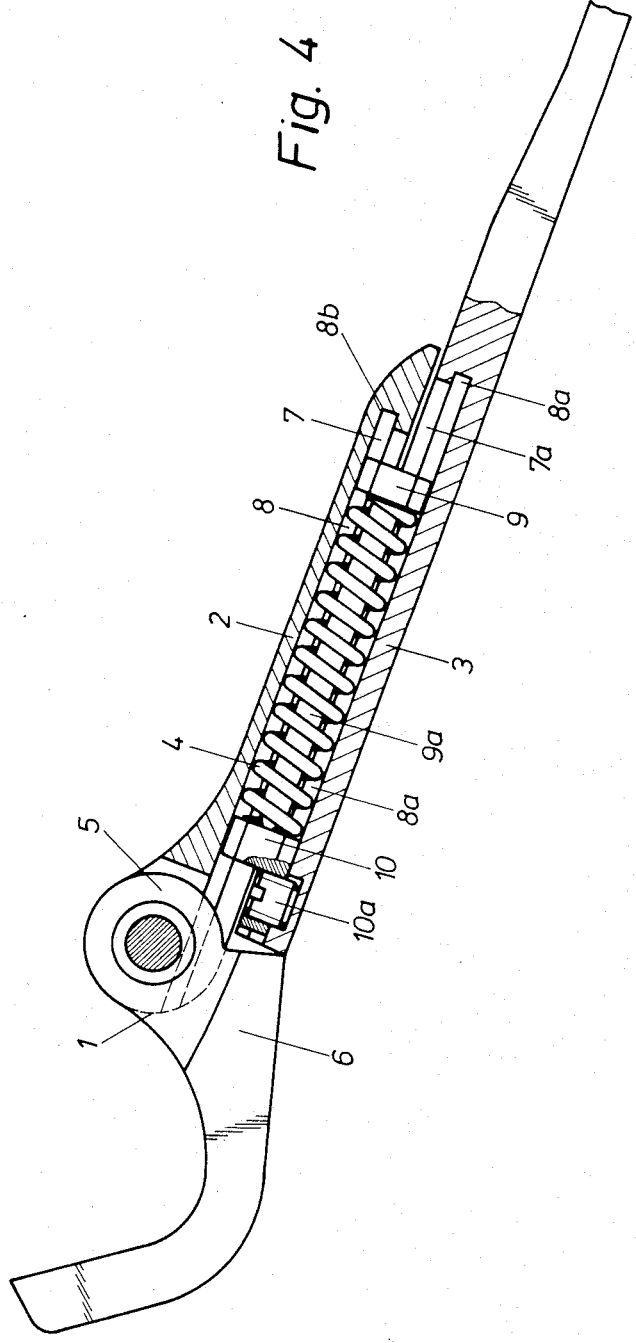

BOW AND SPRING HINGE ASSEMBLY FOR EYEGLASSES

BACKGROUND OF THE INVENTION

1. Field of the Invention

This invention relates to a bow and spring hinge assembly for eyeglasses, which assembly permits the bow to be urged beyond a stop-defined position so that the bow can resiliently bear on the head of the wearer.

2. Description of the Prior Art

German Patent Specification No. 21 15 596 discloses bow and spring hinge assemblies which are of the kind described above and comprise a bow-side hinge member and a rim-side hinge member, which hinge members are pivotally connected, wherein the bow-side hinge member comprises a slider, which accommodates and guides a spring and is displaceable against the force of said spring along the end portion of the bow, which has a recess formed on both sides with track grooves. In that arrangement the slider biased by the spring is guided in the end portion of the bow. Such track grooves ensure a reliable guidance and prevent a canting and provide for a satisfactory covering of the surfaces which are in sliding contact with each other. The arrangement has also a small overall height, but the slider must be provided with side walls which extend into the bow to engage the track grooves therein and add to the width of the assembly. Besides, the small backlash which is due to manufacturing tolerances cannot be eliminated.

SUMMARY OF THE INVENTION

It is an object of the invention to provide a bow and spring hinge assembly which can be used also with narrow bows and which provides for a bias in a transverse direction to eliminate a transverse backlash between the parts which are displaceable relative to each other.

In a bow and spring hinge assembly for eyeglasses which assembly permits the bow to be urged beyond a stop-defined position so that the bow can resiliently bear on the head of the wearer, which assembly comprises a bow-side hinge member and a rim-side hinge member, which hinge members are pivotally connected, wherein the bow-side hinge member comprises a slider, which accommodates and guides a spring and is displaceable against the force of said spring along the end portion of the bow, which has a recess formed on both sides with track grooves, the object set forth hereinbefore is accomplished in that the slider is formed with a recess for accommodating the spring and is formed on both sides of its recess with track grooves, and the end portion of the bow and the slider are connected by I-section members, which extend into the track grooves of the recesses in the bow and in the slider so that the side walls of the slider need not extend into the bow and the width of the spring hinge can be reduced.

Specifically, a rear I-section member is provided as a displaceable spring abutment, and a forward I-section member is provided as a fixed spring abutment. Said rear and forward I-section members are slidably fitted in the track grooves of the slider and of the bow end portion.

To eliminate a transverse backlash between the slider of the bow-side hinge member and the end portion of the bow, the recess in the slider may have a curved rear end face and the track grooves in the slider may be open-ended at said rear end face so that the rear I-section member can be urged by the spring against said curved rear end face. The forward I-section member may be fixed by a screw to the end portion of the bow.

BRIEF DESCRIPTION OF THE DRAWING

FIG. 1 is an exploded view showing a first embodiment of the bow and spring hinge assembly.

FIG. 2 is a transverse sectional view showing the guiding arrangement in the bow of the eyeglasses.

FIGS. 3 and 4 are longitudinal sectional views showing the first embodiment of the bow and spring hinge assembly with the bow in open and spring-biased positions.

DETAILED DESCRIPTION OF THE PREFERRED EMBODIMENT

Figure 5:
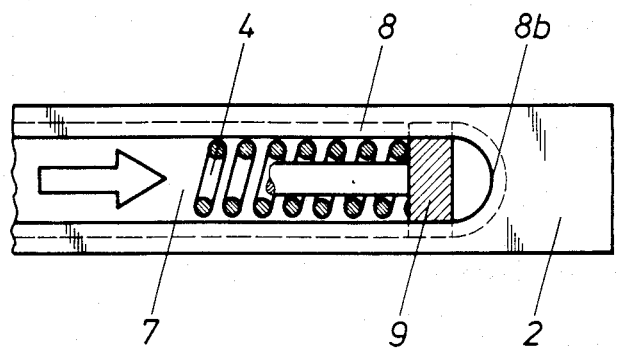
FIG. 5 is a top plan view showing the means for bracing the rear I-section member.

Further details of the bow and spring hinge assembly in accordance with the invention are shown in the drawing, which illustrates preferred embodiments, and will now be described.

In the first embodiment shown in FIGS. 1 to 5, the spring hinge comprises a bow-side hinge member, which includes two axially spaced apart, coaxial hinge eyes 1 and a slider 2, which cooperates with the inner end portion 3 of the bow through an interposed compression spring 4. The hinge also comprises a rim-side hinge member, which is anchored in the rim 6 of the eyeglasses and comprises a hinge eye 5, which is disposed between and pivoted to the hinge eyes 1 of the bow-side hinge member.

The slider 2 and the bow end portion 3 are provided each with a recess 7 or 7a. Said recesses 7 and 7a face each other to constitute a receptacle for the spring 4. Each of said recesses 7 and 7a is formed on opposite sides with track grooves 8 or 8a, which are open toward each other and receive a rear I-section member 9 and a forward I-section member 10. The rear I-section member 9 constitutes a displaceable spring abutment for the spring 4, which is fitted on a rod 9a carried by the rear I-section member 9. The rod 9a is engageable with the forward I-section member 10 to limit the compression of the spring 4. The forward I-section member 10 constitutes a fixed spring abutment, which is detachably secured to the end portion 3 of the bow.

The recess 7 in the slider 2 has a curved rear end face 8b and the track grooves 8 in the slider 2 are open-ended at said rear end face 8b so that the spring 4 can urge the rear I-section member 9 against said curved rear end face 8b (FIG. 5), which thus constitutes an abutment for a transverse bracing. For this purpose the track grooves 8a formed in the end portion 3 of the bow extend beyond the curved rear end face 8b, as is shown in FIG. 3. The forward I-section member 10 is fixed by a screw 10a to the bow end portion 3 in the track groove 8a and constitutes a second abutment for a transverse bracing so that there will be no transverse backlash between the slider 2 and the bow end portion 3 which are slidable relative to each other. In FIG. 4 the bow of FIG. 3 is shown in a position to which it has been forced beyond its normally open position. FIG. 1 is an exploded view showing the components of the assembly and FIG. 2 is a transverse sectional view showing the track grooves 8 and 8a in the slider 2 and the bow end portion 3.

Figure 7:
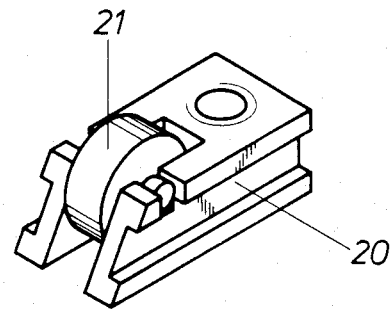
FIG. 7 is a perspective view showing the forward I-section member of the embodiment of FIG. 6 with rollers carried by said member.
Figure 6:
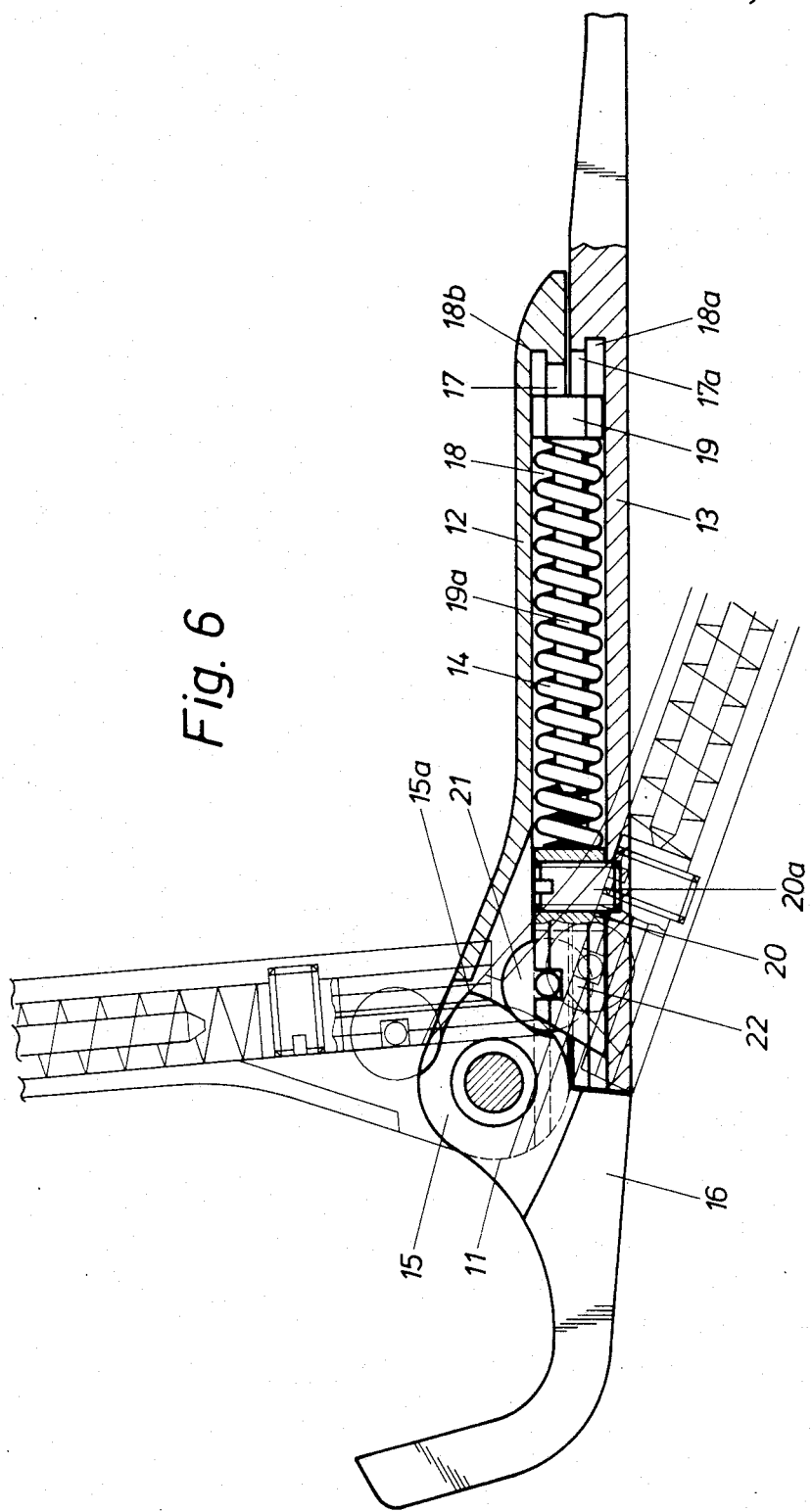
FIG. 6 is a longitudinal sectional view showing another embodiment of the assembly, in which a snap action takes place during the movement of the bow between closed and open positions.

The second embodiment shown in FIGS. 6 and 7 provides for a snap action as the bow is moved between its normal open position and its closed position. That spring hinge also comprises a bow-side hinge member including two coaxial and axially spaced apart hinge eyes 11 and a slider 12, which cooperates with the end portion 13 of the bow through an interposed compression spring 14. The hinge also comprises a rim-side hinge member, which includes a hinge eye 15 extending between the hinge eyes 11 and is anchored in the rim 16. In that embodiment the eye 15 of the rim-side hinge member is provided with a radial cam 15a for producing a snap action in a manner which will be described hereinafter.

In this embodiment, the slider 12 and the bow end portion 13 are also formed each with a recess 17 or 17a, which recesses accommodate the spring 14 and are provided each on opposite sides with track grooves 18 and 18a, respectively, which are open toward each other. In said track grooves, a rear I-section member 19 and a forward I-section member 20 are slidably fitted. The rear I-section member 19 serves again as a displaceable spring abutment and carries a rod 19a, for guiding the compression spring 14, which is fitted on the rod. The rod 19a is also engageable with the forward I-section member 20 to limit the compression of the spring 14. The forward I-section member 20 constitutes a fixed spring abutment and is detachably fixed to the bow end portion 13 by a screw 20a. In this embodiment the forward I-section member 20 carries a rotatably mounted roller 21 (FIG. 7) for producing a snap action by a radial engagement with the cam 15a of the rim-side hinge eye 15.

In this embodiment the recess 17 of the slider 12 has also a curved end face 18b and the track grooves 18 of the slider 12 are open-ended at said curved end face 18b so that the spring 14 can urge the rear I-section member 19 against the curved rear end face 18b so that the latter constitutes an abutment for a transverse bracing. The forward I-section member 20 is fixed by the screw 20a to the bow end portion 13. As a result, the forward I-section member 20 constitutes also an abutment for the transverse bracing, by which a transverse backlash is eliminated. FIG. 6 shows the bow in its normal open position and shows in phantom the bow in its spring-biased open position and in its closed position.

To facilitate the insertion of the forward I-section member 20 into the track grooves against the force of the stressed spring 14, a forward portion of the recess 17a of the bow end portion 13 is covered by a top portion defining a tunnel 22 under the hinge eyes 11 so that the I-section member 20 can be introduced through the tunnel 22 and can be held back by the top portion of said tunnel as the screw 20a is inserted. The fixing screw 20a may be replaced by a locking member, such as is shown in German Pat. No. 22 42 044.

Figure 8:
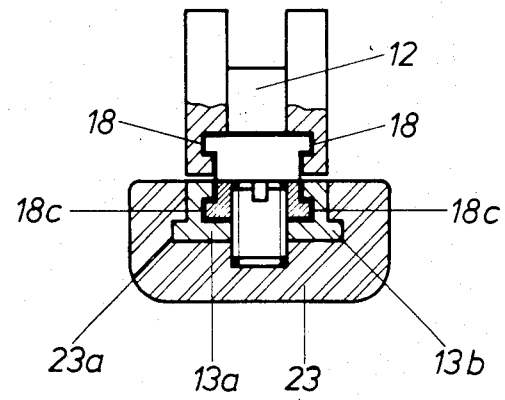
FIG. 8 is a sectional view showing an assembly comprising a bow made of plastic or aluminum.

FIG. 8 is a sectional view showing the guiding means for a bow-side hinge member mounted on a bow of plastic or aluminum. The embodiments described hereinbefore are intended for use with a bow made of relatively hard metal so that the track grooves can be formed in the end portion of the bow. In the embodiment shown in FIG. 8, the slider 12 provided with the track grooves 18 is the same as in FIGS. 6 and 7. On the other hand, the track grooves 18c are not formed in the bow end portion 23 itself but in a bow insert 13a, which has side ribs 13b, which are fixed to the bow 23 in retaining grooves 23a formed in the bow, which is made of plastic or aluminum. As a result, the track grooves provided in the plastic bow are defined by a metallic insert and in an aluminum bow there will be no friction between the end portion of the bow and the slider consisting of a different metal.

I claim:

1. In a bow and spring hinge assembly for eyeglasses, which assembly permits the bow to be opened against spring force beyond a stop-defined position, said assembly comprising a bow having an inner end portion formed with a first recess, which extends in the longitudinal direction of said bow, said bow being provided in said recess on opposite sides thereof with first track grooves, which are open toward each other, a rim-side hinge member adapted to be connected to an eyeglass rim, a bow-side hinge member, which is pivoted to said rim-side hinge member and includes a slider, which is slidably mounted on said bow end portion and guided by said first track grooves in said longitudinal direction, and a double-ended spring extending between said bow and said slider and adapted to urge said bow relative to said slider toward said rim-side hinge member as said bow is opened beyond said stop-defined position, the improvement residing in that said slider is formed with a second recess, which extends in said longitudinal direction and is open toward said first recess, said second recess in said slider on opposite sides thereof being provided with second track grooves, which extend in said longitudinal direction and are open toward each other, said spring extends in said first and second recesses, separate forward and rear I-section members are provided, each of which has first and second end flanges, said first end flanges are in sliding engagement with said track grooves in said inner end portion, and said second end flanges are in sliding engagement with said track grooves in said slider, whereby said inner end portion and said slider are held together by said I-section members against a separation in a direction which is transverse to said longitudinal direction.

2. The improvement set forth in claim 1 as applied to a bow and spring hinge assembly comprising forward and rear spring abutments, which are interposed between respective ends of said spring and said slider and said inner end portion, respectively, wherein said forward spring abutment is fixed to said inner end portion and comprises said forward I-section member and said rear spring abutment comprises said rear I-section member.

3. The improvement set forth in claim 2 as applied to a bow and spring hinge assembly in which said spring is a compression spring, wherein said rear I-section member carries a rod, which extends in said spring toward said forward I-section member and is normally spaced from said forward I-section member and engageable therewith to limit the compression of said spring.

4. The improvement set forth in claim 2, wherein said forward spring abutment is detachably fixed to said inner end portion.

5. The improvement set forth in claim 4, wherein said forward I-section member is detachably locked to said inner end portion by a fixing member.

6. The improvement set forth in claim 4, wherein said forward I-section member is detachably locked to said inner end portion by a screw.

7. The improvement set forth in claim 6, wherein
said second recess has a curved end face remote from said rim-side hinge member,
said second track grooves are open-ended adjacent to said curved end face, and
said spring is adapted to urge said rear I-section member against said curved end face of said second recess.

8. The improvement set forth in claim 7, wherein said first track grooves in said slider extend beyond said second track grooves adjacent to said curved end face.

9. The improvement set forth in claim 2 as applied to a bow and spring hinge assembly in which said rim-side hinge member has a radial cam which radially faces said bow-side hinge member and is radially engageable to produce a snap action as said bow is moved from said stop-defined position toward a closed position, wherein said forward I-section member is radially engageable with said cam to produce said snap action.

10. The improvement set forth in claim 9, wherein said I-section member has a rounded edge, which is radially engageable with said cam to produce said snap action.

11. The improvement set forth in claim 9, wherein a roller is rotatably mounted in said forward I-section member and radially engageable with said cam to produce said snap action.

12. The improvement set forth in claim 1 as applied to a bow and spring hinge assembly in which said bow-side hinge member comprises eye means which are pivoted to said rim-side hinge member and said first recess has a forward portion which is disposed radially outwardly of said eye means, wherein
said bow-side hinge member comprises a covering portion, which covers said forward portion of said first recess to define therewith a tunnel,
each of said I-section members is adapted to be introduced into said track grooves through said tunnel,
said covering portion is adapted to hold back said forward I-section member against the force of said spring in a predetermined position, and
fixing means are provided for securing said forward I-section member to said inner end portion of said bow in said predetermined position.

13. The improvement set forth in claim 1, wherein said track grooves are formed in said inner end portion.

14. The improvement set forth in claim 1, wherein an insert is provided, which is fixed in said inner end portion and formed with said first recess and with said first track grooves.

15. The improvement set forth in claim 14, wherein
said inner end portion is provided with an insert-accommodating recess formed on opposite sides with retaining grooves, which are open toward each other and extend in said longitudinal direction and
said insert is provided on opposite sides with external ribs, which extend in said longitudinal direction and are fixed in said retaining grooves.

16. The improvement set forth in claim 15, wherein said inner end portion consists of aluminum.

17. The improvement set forth in claim 14, wherein said inner end portion consists of plastic.

18. The improvement set forth in claim 14, wherein said inner end portion consists of aluminum.

* * * * *